(12) United States Patent
Whitlock

(10) Patent No.: US 7,794,523 B2
(45) Date of Patent: Sep. 14, 2010

(54) METHOD FOR THE RECOVERY AND RE-USE OF PROCESS GASES

(75) Inventor: Walter H. Whitlock, Chapel Hill, NC (US)

(73) Assignee: Linde LLC, Murray Hill, NJ (US)

(*) Notice: Subject to any disclaimer, the term of this patent is extended or adjusted under 35 U.S.C. 154(b) by 392 days.

(21) Appl. No.: 11/598,928

(22) Filed: Nov. 14, 2006

(65) Prior Publication Data

US 2008/0110743 A1    May 15, 2008

(51) Int. Cl.
*B01D 59/10* (2006.01)
*B01D 53/22* (2006.01)

(52) U.S. Cl. ............ 95/45; 95/92; 95/149; 55/DIG. 30; 423/210

(58) Field of Classification Search ............. 423/210; 203/4; 202/154; 95/45, 92, 149; 55/DIG. 30
See application file for complete search history.

(56) References Cited

U.S. PATENT DOCUMENTS

| | | | | |
|---|---|---|---|---|
| 5,624,534 A | * | 4/1997 | Boucher et al. | 202/153 |
| 5,919,285 A | * | 7/1999 | Li et al. | 95/45 |
| 5,994,604 A | * | 11/1999 | Reagen et al. | 585/469 |
| 6,180,168 B1 | * | 1/2001 | Stookey et al. | 427/235 |
| 6,605,133 B1 | * | 8/2003 | Li et al. | 95/45 |

FOREIGN PATENT DOCUMENTS

JP    53093169 A  *  8/1978

\* cited by examiner

*Primary Examiner*—Jerry Lorengo
*Assistant Examiner*—Rebecca Lee
(74) *Attorney, Agent, or Firm*—David A. Hey

(57) ABSTRACT

The present invention relates to methods and systems for processing an exhaust stream containing a recyclable component mixed with other components and impurities to produce a high purity product that contains all of the recyclable component. One or more waste streams containing none of the recyclable component are also produced. The present invention particularly relates to the recovery of valuable recyclable components used in the manufacture of semiconductor devices.

16 Claims, 4 Drawing Sheets

METHOD FOR THE RECOVERY AND RE-USE OF PROCESS GASES

FIELD OF THE INVENTION

The present invention relates to methods and systems for processing an exhaust stream containing a recyclable component mixed with other components and impurities to produce a high purity product that contains all of the recyclable component. One or more waste streams containing none of the recyclable component are also produced. The present invention particularly relates to the recovery of valuable recyclable components used in the manufacture of semiconductor devices.

BACKGROUND OF THE INVENTION

Most manufacturing processes use gases and produce exhaust streams that may contain recyclable components. Many of these components are expensive and therefore if recycled could significantly reduce production costs. In addition, the exhaust gases often contain components that are toxic, reactive or difficult to handle. This is especially true for the manufacture of semiconductor devices that employ expensive and dangerous gases in the production processes.

For example, many semiconductor manufacturing processes use or produce gases having very high global warming potentials, such as $SF_6$, $C_2F_6$, and $CF_4$ that if recycled would present no environmental concern and would reduce overall costs related to the abatement or disposal thereof. Other possible recyclable components in the exhaust streams include Xe (xenon), Kr (krypton), $CF_4$ (carbon tetrafluoride), $C_2F_6$ (hexafluoro-ethane), $SF_6$ (sulfur hexafluoride), $NH_3$ (ammonia), and components that do not undergo significant reaction or decomposition with pure water, or various water containing solutions such as KOH (potassium hydroxide), NaOH (sodium hydroxide), or $H_2O_2$ (hydrogen peroxide). Again, if these components were recycled, a significant overall cost savings could be realized.

Currently the process gases from semiconductor etch or deposition processes are not recycled. Rather, the process gases are normally disposed of after use in the process chamber. As noted above, these gases may be expensive and may include dangerous properties. In addition, it is common for a relatively large excess of process gases to be used in the production step and therefore a high percentage of the process gases are not consumed during the production step. This results in a greater expense and risk. Recycling just the unused process gases could provide a significant cost reduction for the process.

SUMMARY OF INVENTION

The present invention provides methods and systems for the recovery of recyclable components from a gaseous exhaust stream of a manufacturing process. In particular, the present invention provides methods and systems that recycle the gas components from a manufacturing process, such as a semiconductor manufacturing process, thereby overcoming potential hazardous waste release as well as providing cost savings.

DETAILED DESCRIPTION OF THE INVENTION

Figure 1:
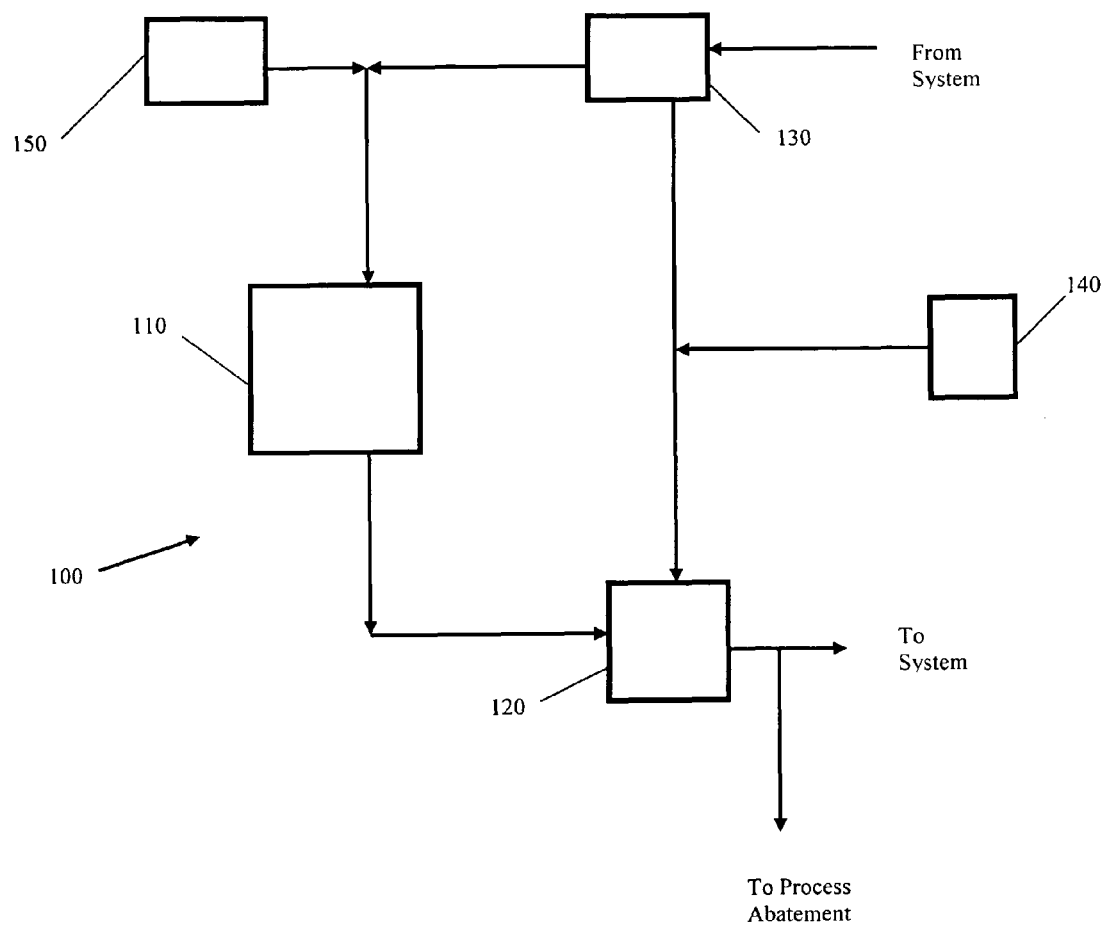
FIG. 1 is a schematic drawing of a process chamber portion of a system according to one embodiment of the present invention.

The present invention relates to methods and systems for processing an exhaust stream containing a recyclable component mixed with other components and impurities to produce a high purity product that contains all of the recyclable component. One or more waste streams containing none of the recyclable component are also produced. The present invention particularly relates to the recovery of recyclable components used in the manufacture of semiconductor devices. The recyclable component to be recovered by the methods and systems of the present invention, may be any one or more of Xe, Kr, $CF_4$, $C_2F_6$, $SF_6$, $NH_3$, and components that do not undergo significant reaction or decomposition with pure water, or various water containing solutions such as KOH, NaOH, or $H_2O_2$.

The methods and systems of the present invention can be used to recover and produce any high purity component by applying the appropriate temperatures and pressures adjusted to account for the different physical properties, such as boiling point, of the component to be separated and recovered. The following describes the general method and system of the present invention with more specific examples provided thereafter.

An exhaust stream containing the recyclable component and other components or impurities is processed to produce both a high purity recyclable component stream suitable for re-use and various waste streams free of the recyclable component that can be further processed without concern for release of the recyclable component. For example, the exhaust stream may be generated by a silicon etch process employing the recyclable component and other feed gases, such as oxygen, in a plasma chamber. The present invention separates the recyclable component from the other components and impurities and produces a high purity recyclable component available for re-use. The present invention also removes all of the recyclable component from the waste streams so that no recyclable component is released.

The method of the present invention comprises the following steps. The exhaust stream containing the recyclable component exits from a process and is scrubbed with water. This removes silicon containing impurities and water reactive impurities resulting in a first scrubbed stream. The first scrubbed stream is then further scrubbed with a water containing solution, such as a KOH solution in a bed of activated carbon catalyst. This second scrubbing step removes sulfur impurities and all trace amounts of acid impurities, resulting in a second scrubbed stream. The second scrubbed stream may be compressed and passed through a heat exchanger and coalescing filters, to remove substantial amounts of water by condensation, to make a dry compressed stream. The dry compressed stream is further dried, such as in a pressure swing adsorption (PSA) process, to remove trace amounts of water, resulting in an ultra-dry stream. The ultra-dry stream is cooled and partially condensed to make a liquid reflux stream enriched in the recyclable component and an overhead vapor stream depleted in the recyclable component. The liquid reflux stream is distilled to remove all the impurities to make a substantially pure recyclable component stream available for re-use. The overhead vapor stream may be further treated, such as in a second pressure swing adsorption (PSA) process, to recover trace amounts of the recyclable component and to produce a vent stream that is free of recyclable component and that is suitable for venting or further processing without concern for release of the recyclable component.

The above process provides a means to recover substantially all the recyclable component at a purity level necessary for re-use and to avoid release of the recyclable component to exhaust or waste. The individual process steps are discussed in greater detail below with reference to the drawing figures.

FIG. 1 is a schematic drawing of a process chamber portion 100 of a system according to the present invention, including a process chamber 110 and a vacuum pump 120 as required by most silicon etch applications communicating with the process chamber 110. The vacuum pump 120 requires a purge gas to be flowed through during operation to avoid potential buildup of impurities and clogging. Generally, nitrogen is used as the purge gas and is supplied at a flow rate in the range of 88 liters per minute or more. However, this quantity of nitrogen imposes a significant load on the system. Because the purge gas only needs to be dry and relatively inert, in one embodiment of the present invention, at least some of the recyclable component is used as the purge gas. The recyclable component may be supplied to the vacuum pump 120 from a recycle gas source 130. Optionally, nitrogen from a nitrogen source 140 may be mixed with the recyclable component and supplied to the vacuum pump 120. This use of the recyclable component as purge gas allows for the reduction of the nitrogen load on the system. The recycle gas source may be supplied from another portion of the system according to the present invention, including the dryer portion or the distillation portion, for example, as will be described in greater detail below. Also shown in FIG. 1 is a process gas source 150 that provides process gases to the process chamber 110. While only a single source is shown, it will be apparent to one skilled in the art that any number of sources as needed by the process can be provided.

Figure 2:
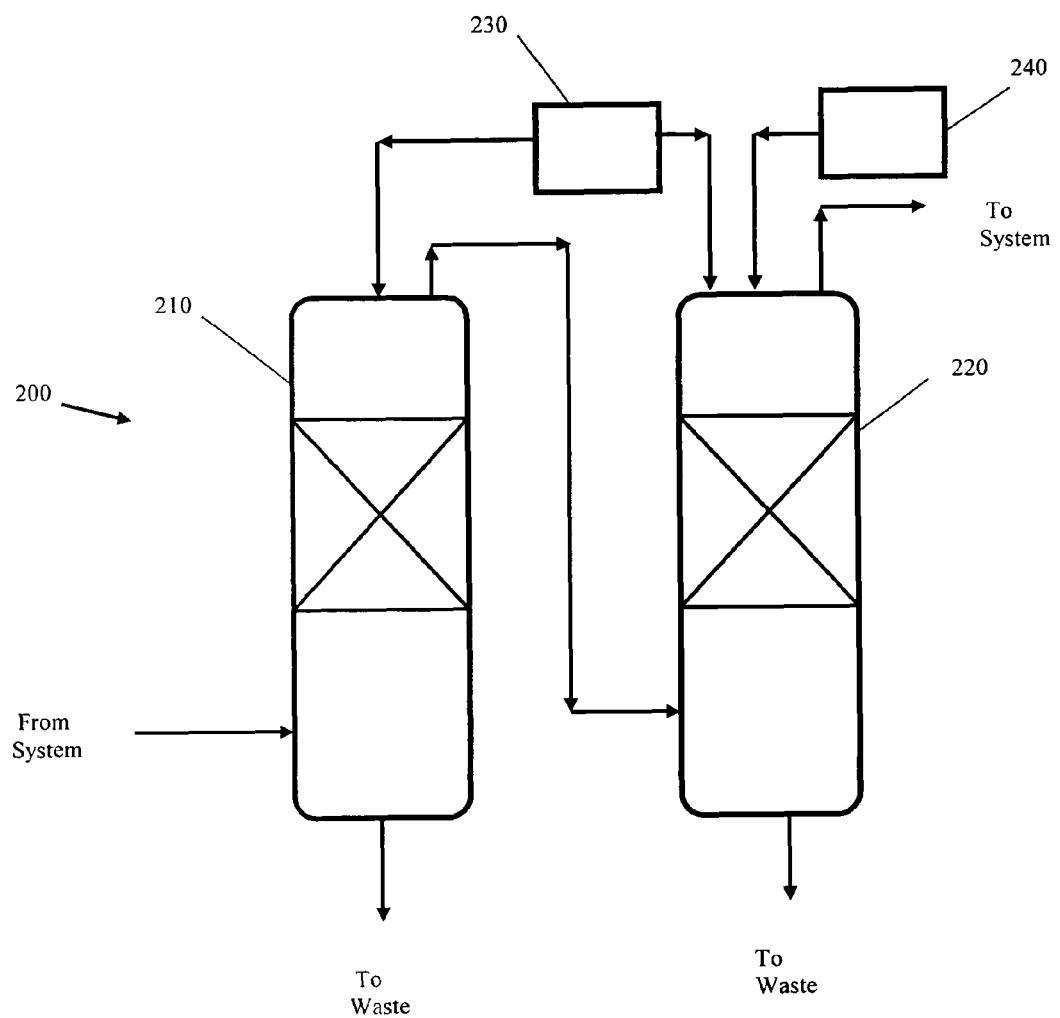
FIG. 2 is a schematic drawing of a scrubber portion of a system according to one embodiment of the present invention.

FIG. 2 is a schematic drawing of a scrubber portion 200 of the system according to the present invention, including a primary scrubber 210 and a caustic scrubber 220. Process gas containing the recyclable component coming from the vacuum pump 120 (FIG. 1) enters the primary scrubber 210 that removes silicon containing impurities and other water reactive impurities by counter current washing with de-mineralized water from a de-mineralized water source 230. Following treatment, the water containing the silicon and water reactive impurities is sent to a waste or abatement facility. The treated gas is then sent to the caustic scrubber 220 that removes sulfur compounds, such as $SO_2F_2$ and acid gas impurities by counter current washing with a water containing solution, such as potassium hydroxide, from a caustic solution source 240, on a bed of hydrophilic activated carbon. Again de-mineralized water may be provided from the de-mineralized water source 230. This type of process is described in U.S. Pat. No. 4,465,655, incorporated herein by reference. While silicon containing compounds could also be removed by the caustic scrubber 220, the removed silicon can produce a silica containing gel that accumulates over time and may plug parts of the caustic scrubber 220. However, in accordance with the present invention, by removing the silicon containing compounds in the primary scrubber 210 prior to processing in the caustic scrubber 220, the formation of the silica containing gel is avoided and reliability of the system is improved. Following treatment, the water containing the sulfur compounds and acid gas impurities is sent to a waste or abatement facility. The treated gas exits the caustic scrubber 220 and proceeds to the dryer portion of the system as described in more detail below.

Figure 3:
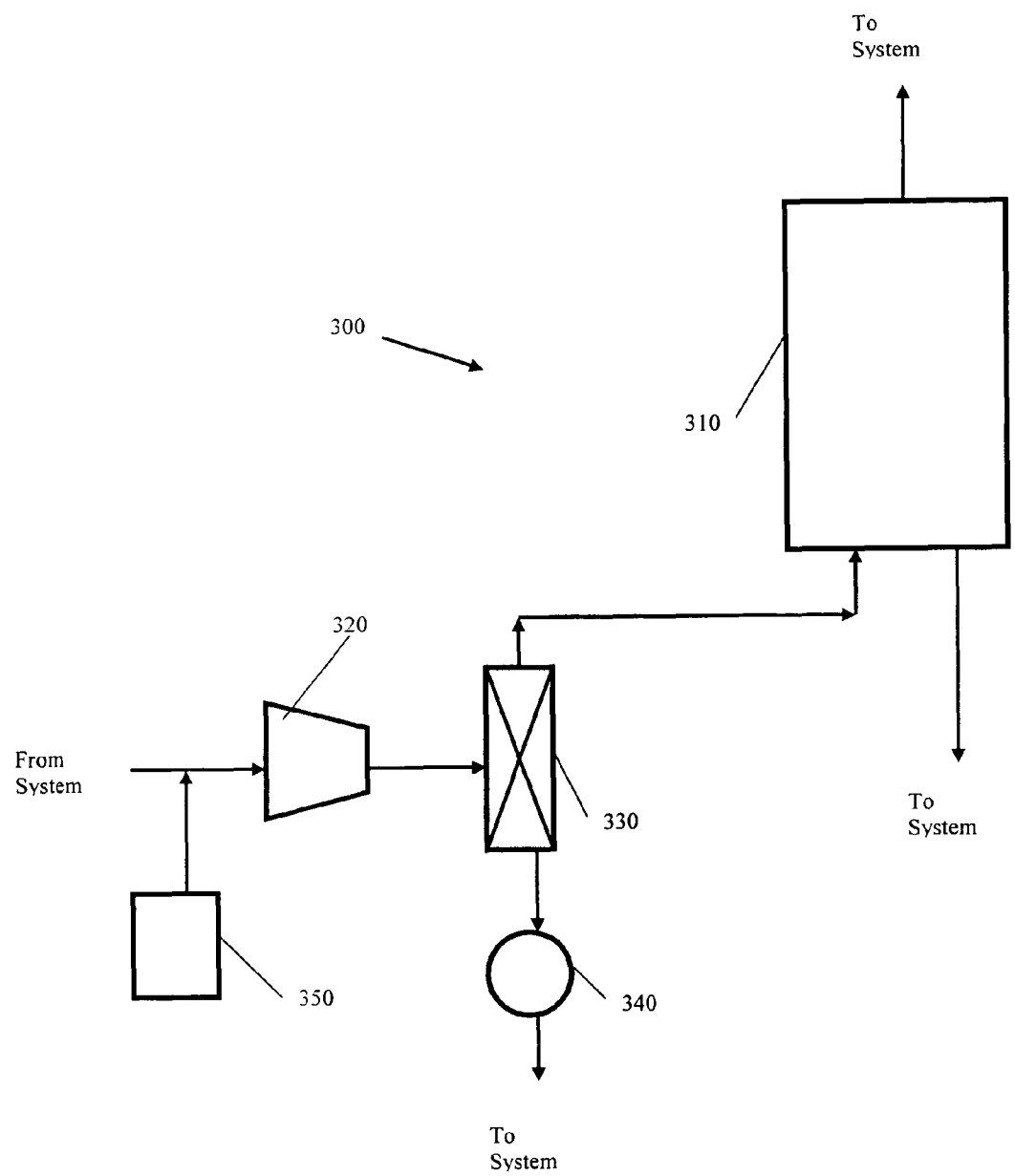
FIG. 3 is a schematic drawing of a dryer portion of a system according to one embodiment of the present invention.

FIG. 3 is a schematic drawing of a dryer portion 300 of the system according to the present invention, including a dryer 310, a compressor 320, a condenser and coalescing filter 330 with water drain valve 340. A low pressure fresh gas source 350 may be included to replenish supplies of the recyclable component consumed in the wafer processing stages. The treated gas coming from the caustic scrubber 220 (FIG. 2) is processed by the compressor 320 and condenser and coalescing filter 330 to remove the bulk of the water by collection and condensation. The collected water contains significant amounts of recyclable component both dissolved in the water and as small bubbles of recyclable component rich gas. In accordance with the present invention, the collected water is returned to the primary scrubber 210 (FIG. 2) for further recovery of the recyclable component prior to discharging the water to waste. The compressed gas is then dried in dryer 310 to remove trace amounts of water. In a preferred embodiment, the dryer 310 is a membrane dryer, such as the hollow polymer fiber air dryer manufactured by Air Products and Chemicals, where water is removed from the compressed gas by selective permeation through the wall of the hollow polymer fiber to produce a dry process gas. A portion of the dry process gas is depressurized to make a purge gas that flows over the outside of the hollow polymer fiber and carries away the water that was removed by the selective permeation process from the process gas. The purge gas containing removed water is returned to the primary scrubber 210 (FIG. 2) for further recovery of the recyclable component.

In an alternative embodiment, the dryer 310 is a PSA (Pressure Swing Adsorption) dryer that removes water by adsorption on an adsorbent, such as activated alumina. Such a PSA dryer may utilize more than one adsorbent bed, preferably two adsorbent beds, so that a continuous process is possible, wherein the first adsorbent bed is in service at elevated pressure and adsorbs water from the process stream while the second adsorbent bed is undergoing regeneration by a reverse flow of low pressure gas which desorbs the previously adsorbed water and removes it from the process. Periodically, the roles of the first and second beds are exchanged so that the first adsorbent bed undergoes regeneration and the second adsorbent bed is in service, thus providing the continuous process operation.

It is known to use a reverse flow of the dry process gas as the regeneration gas for the adsorbent bed. The pressure of the dry process gas is reduced and then introduced to the bed undergoing regeneration to cause a reverse flow of regeneration gas that picks up the adsorbed water. Generally, the regeneration gas containing the adsorbed water is sent to waste. However, this approach has the undesirable result of also releasing any recyclable component that was present in the regeneration gas or that was picked up from the bed undergoing regeneration. Therefore, in accordance with the present invention, the regeneration gas containing the adsorbed water is returned to the primary scrubber 210 (FIG. 2) for further recovery of the recyclable component. The process gas exiting the dryer 310 is sent to the distillation portion of the system according to the present invention as described in more detail below.

Figure 4:
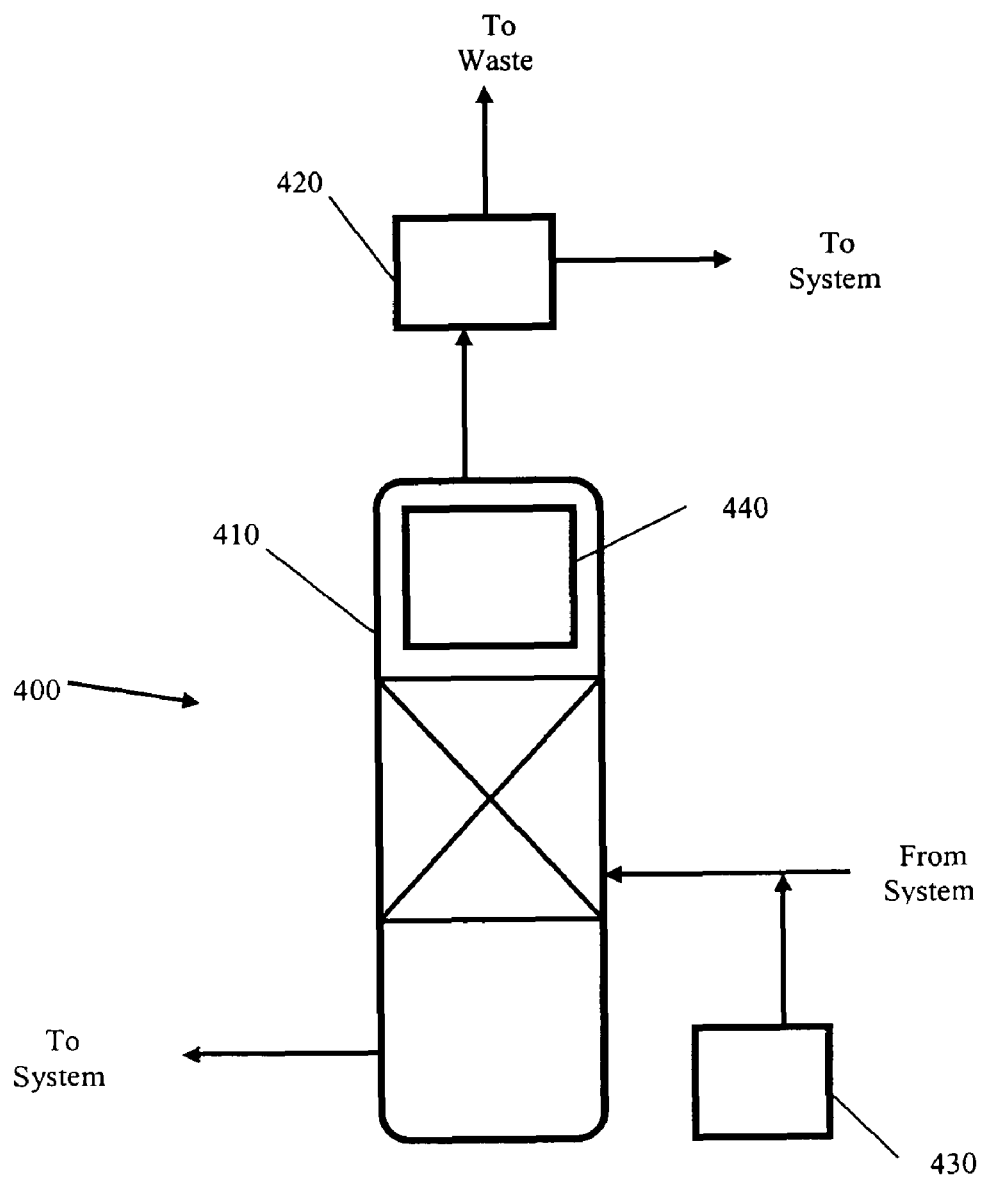
FIG. 4 is a schematic drawing of a distillation portion of a system according to one embodiment of the present invention.

FIG. 4 is a schematic drawing of a distillation portion 400 of the system according to the present invention, including a distillation column 410 with condenser 440 and a separation unit 420. The process gas from the dryer 310 (FIG. 3) enters the distillation column 410 that separates and liquefies the majority of the recyclable component. A fresh gas source 430 may be included to replenish supplies of the recyclable component consumed in the wafer processing stages. The distillation column 410 condenses the recyclable component in the condenser 440 at a temperature near but slightly above the freezing point of the recyclable component to create an overhead vapor stream that is reduced in recyclable component concentration. Condensing at temperatures just slightly above the freezing point of the recyclable component maximizes the condensation of the recyclable component while reducing the risk of freezing the recyclable component. This results in the increased concentration of recyclable component in the condensation stream and reduced concentration of the recyclable component in the overhead vapor stream.

The liquefied recyclable component falls down into a packed distillation column where it is stripped of high volatility impurities by a counter current stream of boilup vapor. The boilup vapor is generated in a reboiler at the bottom of the distillation column 410 and the required reboiler heat duty is provided by standard heating means, such as electric heaters. The liquid recyclable component exits the bottom of the distillation column 410 substantially free of high volatility impurities and is suitable to be vaporized and sent to the recycled gas source 130 (FIG. 1) to be re-used in the process chamber 110 (FIG. 1).

In applications where even higher purity recyclable component is required, a second distillation column (not shown) may be employed, wherein a portion of the boilup vapor passes up the second distillation column in contact with a counter current stream of reflux liquid to remove low volatility impurities. The reflux liquid is returned to the reboiler. At the top of the second column, a portion of the boilup vapor, now free of both high and low volatility impurities, is condensed to make reflux liquid and returned to the top of the second distillation column. The remaining portion, optionally condensed, is withdrawn as high purity recyclable component and may be sent to the recycled gas source 130 (FIG. 1). It is also possible to reverse the roles of the first and second distillation columns such that low volatility impurities are removed in the first distillation column and high volatility impurities are removed in the second distillation column. In this case, the low volatility impurities exit from the bottom of the first distillation column, the high volatility impurities exit from the top of the second distillation column, and the high purity recyclable component exits from the bottom of the second distillation column.

The overhead vapor stream from the distillation column 410 passes to a separation unit 420 where remaining recyclable component is removed to make a recyclable component free stream that can be vented or further processed without concern for loss or release of the recyclable component. The separation may be accomplished by a PSA process similar to that used in the dryer 310, but may employ a molecular sieve, such as a 13x sieve in place of the activated adsorbent. One preferred adsorbent for use in the present invention is HISIV 1000 from UOP LLC.

In a preferred embodiment, the separation unit is a PSA recovery unit having first and second adsorbent beds, one bed being in service removing recyclable component and adsorbing it in the bed while the other bed is being regenerated to desorb and release the captured recyclable component. A portion of the recyclable component free stream exiting the separation unit 420 may serve as a reverse flow regeneration gas for regeneration of the adsorbent beds. To minimize the quantity of regeneration gas needed, a vacuum pump may be used to reduce the pressure in the adsorbent bed undergoing regeneration in a process known as vacuum regeneration. The regeneration gas passes at a very low pressure, about 70 Torr, through the bed undergoing regeneration and flushes recyclable component form the bed. The regeneration gas stream may be returned to the compressor 320 (FIG. 3) to recover recyclable component with virtually no loss or release of recyclable component in the process waste streams from the system.

Alternatively, the regeneration gas stream, or a portion thereof, may be used in the dryer 310 (FIG. 3) as the purge gas for the membrane dryer or as regeneration gas for regeneration of the adsorbent beds therein, and further processed as described above. By using the same stream of regeneration gas for both the separation unit 420 and the dryer 310, the net quantity of regeneration gas used in the process can be reduced.

A more specific example of the present invention relating to the recovery of $SF_6$ follows. In accordance with the present invention, an exhaust stream containing $SF_6$ and various impurities is processed to produce a high purity $SF_6$ stream suitable for re-use and various $SF_6$ free waste streams that can be further processed without concern for release of $SF_6$. The exhaust stream may be generated by a silicon etch process employing $SF_6$ and oxygen as feed gases in a plasma chamber. Such an exhaust stream typically contains waste products of $SiF_4$, HF, $SO_2$, along with unreacted oxygen and $SF_6$. The present invention separates the $SF_6$ from the other components and makes the $SF_6$ available for re-use and also removes all the $SF_6$ from the waste streams so that no $SF_6$ is released with the waste.

In particular, the process according to the present invention comprises the following steps. Initially, an $SF_6$ containing exhaust stream received from a process is scrubbed with water to remove silicon containing impurities ($SiF_4$ for example) and water reactive impurities (F2, HF, $SF_4$ for example), resulting in a first scrubbed stream. The first scrubbed stream is then scrubbed with a KOH solution in a bed of activated carbon catalyst to remove $SO_2F_2$ impurities and all trace amounts of acid impurities ($SO_2$, $SO_3$ for example), to make a second scrubbed stream. The second scrubbed stream is compressed to about 160 psig and passed through heat exchangers and coalescing filters to condense and remove substantial amounts of water and to produce a dry compressed stream. The dry compressed stream is further dried in a PSA dryer to remove trace amounts of water and to make an ultra-dry stream. The ultra-dry stream is cooled and partially condensed to make a liquid reflux stream enriched in $SF_6$ and an overhead vapor stream depleted in $SF_6$. The liquid reflux stream enriched in $SF_6$ is distilled to remove all the non-$SF_6$ components resulting in a substantially pure $SF_6$ stream suitable for re-use as a process gas component. The overhead vapor stream depleted in $SF_6$ is treated in a second PSA process to remove trace amounts of $SF_6$ and to make an $SF_6$ free stream that is suitable for venting or further processing without concern for release of $SF_6$.

In this example, the purge gas for the vacuum pump can be supplied from a variety of processes in the system, such as recycled $SF_6$ from the PSA dryer, the $SF_6$ enriched reflux stream, or the distilled overhead vapor stream. The water scrubber removes silicon containing impurities and other water reactive impurities such as $F_2$, HF, and $SF_4$ by counter current washing with de-mineralized water. The used de-mineralized water may be treated to recover any contained $SF_6$ and then discharged from the process as waste water together with the silicon containing and water reactive impurities. The KOH scrubber removes $SO_2F_2$ and acid gas impurities such as trace $SO_2$ and $SO_3$ by counter current washing with potassium hydroxide (KOH) solution on a bed of hydrophilic activated carbon. As noted, in accordance with the present invention, by providing the initial water scrubber prior to the KOH scrubber, it is possible to avoid silica gel buildup and clogging of the KOH scrubber.

For $SF_6$ the compressor compresses the second scrubbed stream to about 160 psig to remove the bulk of the water. The removed water is returned to the water scrubber to recover any $SF_6$ contained therein before the water is discharged. The PSA dryer removes trace water from the dry compressed stream using first and second adsorption beds of activated alumina. A continuous process is provided by operating the first adsorbent bed at elevated pressure to adsorb water from the dry compressed stream while the second adsorbent bed undergoes regeneration by a reverse flow of low pressure gas to desorb the previously adsorbed water. The roles of the first and second bed are periodically reversed so that continuous operation can be achieved. To avoid the release of any $SF_6$ with the desorbed water, the desorbed water is returned to the water scrubber to recover the contained $SF_6$ prior to discharge.

For condensation of $SF_6$ the distillation column temperature is set to about –48 C and a pressure of 175 psia. The freezing point of $SF_6$ at this pressure is –50 C, and as noted above, the preferred temperature for condensing is as close to the freezing point as possible without going below the freezing point. The chosen temperature of –48 C meets this criteria, i.e., reduces the risk of freezing $SF_6$ while reducing the concentration of $SF_6$ in the overhead vapor stream. At this temperature and pressure, the $SF_6$ concentration in the overhead vapor stream is about 20 mol %.

The liquefied $SF_6$ falls down into a packed distillation column and is stripped of high volatility impurities by a counter current stream of boilup vapor. The boilup vapor is generated in a reboiler at the bottom of the distillation column and the required reboiler heat duty may be provided by any heating means, such as electric heaters. The liquid $SF_6$ that exits the bottom of the distillation column is substantially free of high volatility impurities and is suitable to be vaporized and re-used in the process chamber.

In the event even higher purity $SF_6$ is required, a second distillation column can be used. In this arrangement, a portion of the boilup vapor passes up the second distillation column in contact with a counter current stream of reflux liquid whereby the low volatility impurities are removed and returned to the reboiler. At the top of the second column, a portion of the boilup vapor, now free of both high and low volatility impurities, is condensed to make reflux liquid and returned to the top of the second distillation column. The remaining portion, optionally condensed, is withdrawn as high purity $SF_6$ product.

The second PSA process receives the overhead vapor stream from the distillation column and removes the $SF_6$ from that stream to make an $SF_6$ free stream that can be vented or further processed without concern for loss or release of $SF_6$. The second PSA process can use two adsorption beds similar to the PSA dryer or may use a molecular sieve.

A portion of the $SF_6$ free stream may be used as a regeneration gas for both the second PSA process and the PSA dryer, thus reducing the net quantity of $SF_6$ needed by the process. Further, the regeneration gases are returned to the water scrubber to remove the $SF_6$ thereby assuring virtually no loss or release of $SF_6$ in the process waste streams.

As noted above, the present invention can be used to recover a number of recyclable components from an exhaust stream. Table 1 below provides the freezing point temperature and the appropriate distillation column operating temperature for several other recyclable components.

TABLE 1

| Recyclable Component | Freezing Temperature (° C.) | Condenser Temperature (° C.) |
|---|---|---|
| $C_2F_6$ | −100 | −98 |
| Xenon | −111.8 | −109 |
| $CF_4$ | −183.6 | −167 |
| $NH_3$ | −77.7 | −75 |
| Krypton | −157.4 | −155 |

It is anticipated that other embodiments and variations of the present invention will become readily apparent to the skilled artisan in the light of the foregoing description and it is intended that such embodiments and variations likewise be included within the scope of the invention as set out in the appended claims.

What is claimed:

1. A method for the recovery of process gas, comprising:
scrubbing a gas exhaust stream containing the process gas with water in a first scrubber to obtain a first scrubbed stream;
scrubbing the first scrubbed stream with a water containing solution in a catalyst bed in a second scrubber to obtain a second scrubbed stream;
compressing the second scrubbed stream;
drying the second scrubbed stream in a heat exchanger process;
filtering the second scrubbed stream to obtain a dry compressed stream;
further drying the dry compressed stream to obtain an ultra-dry stream;
cooling the ultra-dry stream to obtain a liquid reflux stream enriched in the process gas and a vapor stream depleted in the process gas;
distilling the liquid reflux stream to recover a substantially pure process gas.

2. A method according to claim 1, further comprising treating the vapor stream to recover trace amounts of the process gas and a vent stream free of process gas.

3. A method according to claim 1, wherein the process gas is Xe, Kr, $CF_4$, $C_2F_6$, $SF_6$, or $NH_3$.

4. A method according to claim 1, wherein the water containing solution is KOH, NaOH or $H_2O_2$.

5. A method according to claim 1, wherein the catalyst bed is an activated carbon catalyst bed or a hydrophilic activated carbon catalyst bed.

6. A method according to claim 1, wherein further drying comprises drying in a membrane dryer.

7. A method according to claim 6, wherein a portion of the dry compressed stream is used as a purge gas for the membrane dryer.

8. A method according to claim 7, further comprising returning the dry compressed stream used as a purge gas to the first scrubber.

9. A method according to claim 1, wherein further drying comprises a pressure swing adsorption process using an adsorbent.

10. A method according to claim 1, cooling the ultra-dry stream comprising cooling to a temperature less than 16 degrees above the freezing temperature of the process gas.

11. A method according to claim 10, wherein the temperature is less than 3 degrees above the freezing temperature of the process gas.

12. A method according to claim 1, wherein distilling comprises stripping high volatility impurities from the liquid reflux stream to obtain a substantially pure liquid reflux stream and further comprising vaporizing the substantially pure liquid reflux steam to obtain the substantially pure process gas.

13. A method according to claim 1, wherein distilling comprises removing high volatility impurities in a first distillation column and removing low volatility impurities in a second distillation column.

14. A method according to claim 1, further comprising treating the vapor steam to separate any trace amounts of process gas.

15. A method according to claim 14, wherein treating comprises a pressure swing adsorption process or a molecular sieve.

16. A method according to claim 1, wherein the gas exhaust stream comes from a semiconductor process.

\* \* \* \* \*